US006356329B1

United States Patent
Tamatani et al.

(10) Patent No.: US 6,356,329 B1
(45) Date of Patent: *Mar. 12, 2002

(54) LIQUID CRYSTAL DISPLAY APPARATUS WITH REDUCED VISUAL ANGLE DEGRADATION

(75) Inventors: Akira Tamatani; Fumio Matsukawa; Akira Tsumura; Shin Tahata; Masaya Mizunuma; Yasuhiro Morii; Masayuki Fujii, all of Tokyo; Yasuo Fujita, Kumamoto, all of (JP)

(73) Assignees: Mitsubishi Denki Kabushiki Kaisha, Tokyo; Advanced Display Inc., Kikuchi-gun, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,665

(22) Filed: Jan. 27, 1999

(51) Int. Cl.$^7$ .................. G02F 1/1343; G02F 1/1335; G02F 1/1337

(52) U.S. Cl. .................. 349/141; 349/117; 349/123; 349/128; 349/132

(58) Field of Search .................. 349/117, 123, 349/128, 132, 141

(56) References Cited

U.S. PATENT DOCUMENTS 4,181,563 A * 1/1980 Miyaka et al. .............. 156/643

(List continued on next page.)

FOREIGN PATENT DOCUMENTS

| JP | 01-120528 A | * 5/1989 |
| JP | 6-160878 | 6/1994 |
| JP | 6-194645 | 7/1994 |
| JP | 6-202127 | 7/1994 |
| JP | 7-72491 | 3/1995 |
| JP | 9-80436 | 3/1997 |
| JP | 9-146125 | 6/1997 |
| JP | 9-160042 | 6/1997 |
| JP | 10-232392 | 2/1998 |
| JP | 10-228016 | 8/1998 |
| JP | 10-307295 | 11/1998 |
| JP | 11-2816 | 1/1999 |
| JP | 11-24068 | 1/1999 |

OTHER PUBLICATIONS

Masahito OH–E et al., "Dependence of Viewing Angle Characteristics on Pretilt Angle in the In–Plane Switching Mode", Liqud Crystals, 1997, vol. 22, No. 4, pp. 391–400.
R. Kiefer et al., "P2–30 In–Plane Switching of Nematic Liquid Crystals", Japan Display, 1992, pp. 547–550.

Primary Examiner—William L. Sikes
Assistant Examiner—Tarifur R. Chowdhury
(74) Attorney, Agent, or Firm—Oblon, Spivak, McClelland, Maier & Neustadt, P.C.

(57) ABSTRACT

The present invention discloses a liquid crystal display apparatus including (1) a liquid crystal panel including an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying predetermined electric signals to the pixel electrodes and the counter electrodes, wherein inclining directions of liquid crystal molecules which are closest to the electrodes substrate and those of liquid crystal molecules which are closest to the counter substrate are identical, and aligning directions of liquid crystal molecules which are closest to the electrodes substrate and those of liquid crystal molecules which are closest to the counter substrate are parallel to each other.

8 Claims, 16 Drawing Sheets

U.S. PATENT DOCUMENTS

| | | | |
|---|---|---|---|
| 4,813,770 A | * | 3/1989 | Clerc et al. .............. 350/347 E |
| 5,737,051 A | * | 4/1998 | Kondo et al. ................ 349/141 |
| 5,801,799 A | * | 9/1998 | Chen et al. .................... 349/74 |
| 5,859,682 A | * | 1/1999 | Kim et al. ................... 349/124 |
| 5,907,380 A | * | 5/1999 | Lien ............................ 349/141 |
| 5,953,092 A | * | 9/1999 | Sung et al. ................. 349/143 |
| 5,986,735 A | * | 11/1999 | Komatsu .................... 349/128 |
| 6,005,650 A | * | 12/1999 | Kim et al. ................... 349/130 |
| 6,028,656 A | * | 2/2000 | Buhrer et al. ............... 349/196 |
| 6,052,168 A | * | 4/2000 | Nishida et al. ............. 349/141 |
| 6,067,140 A | * | 5/2000 | Woo et al. .................. 349/129 |
| 6,078,375 A | * | 6/2000 | Matsumoto et al. ........ 349/123 |
| 6,124,914 A | * | 9/2000 | Chaudhari et al. .......... 349/129 |

* cited by examiner

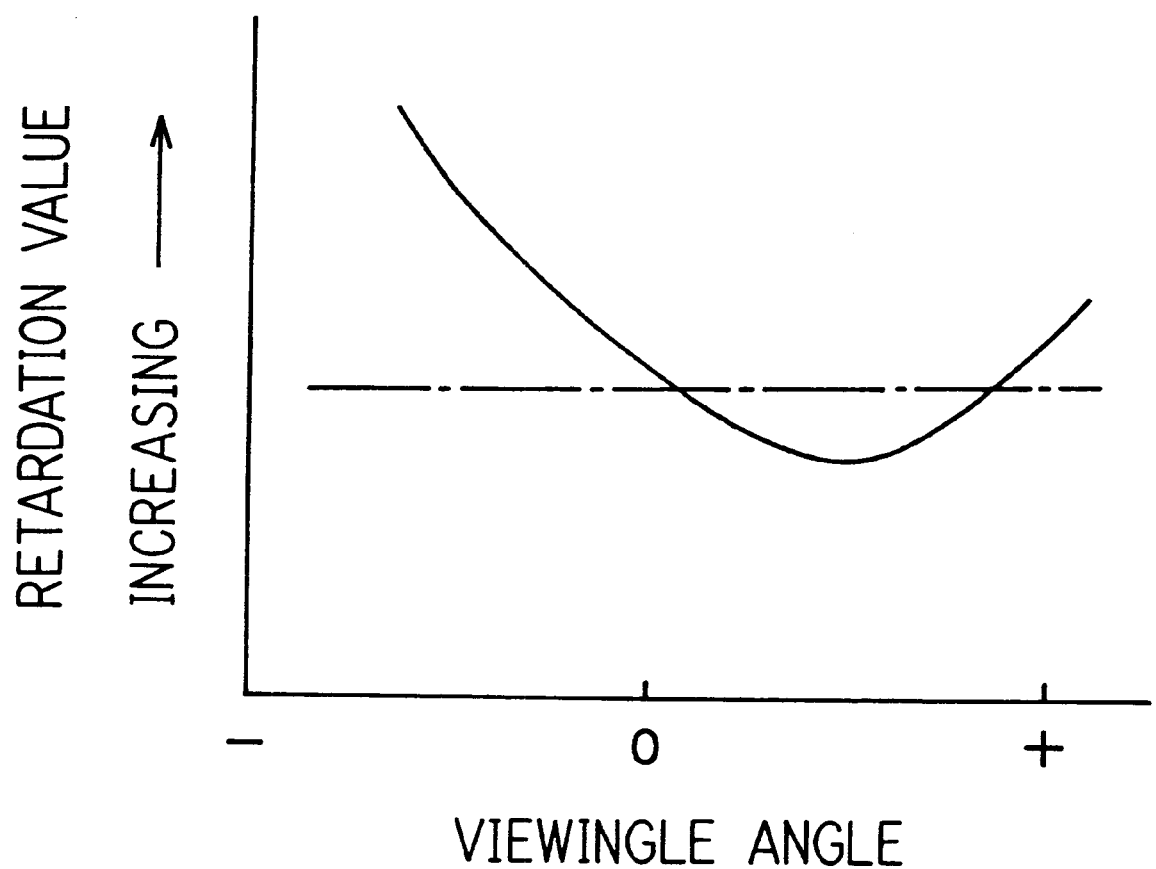

FIG.14
PRIOR ART
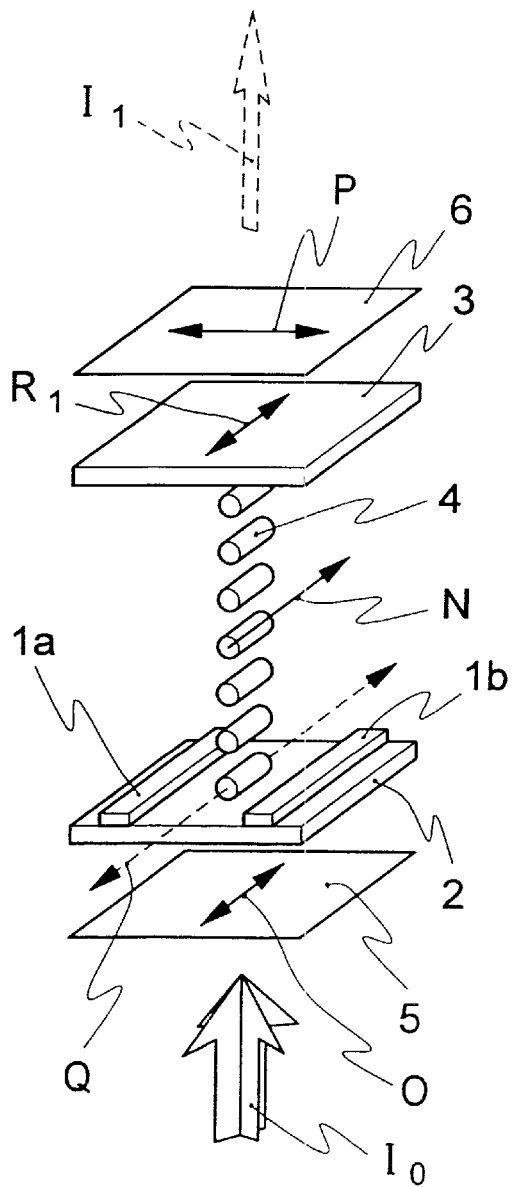
ELECTRIC FIELD "OFF" STATE
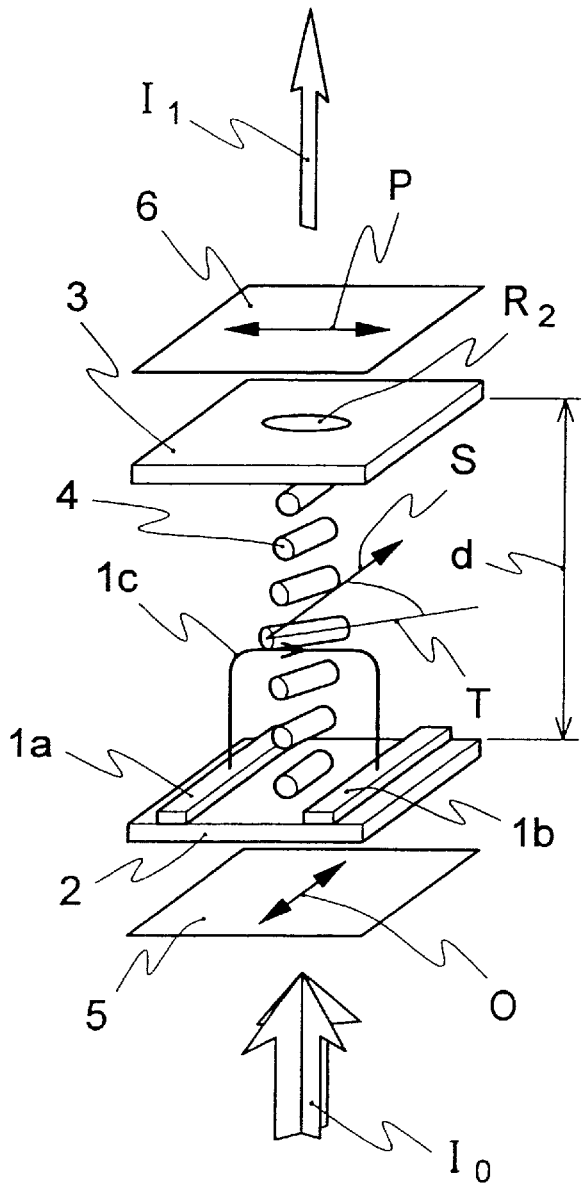
ELECTRIC FIELD "ON" STATE

LIQUID CRYSTAL DISPLAY APPARATUS WITH REDUCED VISUAL ANGLE DEGRADATION

BACKGROUND OF THE INVENTION

The present invention relates to an in-plane switching liquid crystal display apparatus obtained by adhering two substrates, at least one of which comprise electrodes of comb-like shape, together and enclosing liquid crystal therebetween. More particularly, the present invention relates to a liquid crystal display apparatus which can restrict variations in display property such as color changes or the like depending on visual angles.

Liquid crystal display apparatuses are being widely used in watches or electronic desk calculators due to their properties of being, for instance, thin-sized, light-weighted and of consuming low electricity. Especially TN (twisted nematic) liquid crystal display apparatuses which perform active driving through, for instance, TFTs (thin film transistors) are gradually replacing CRTs which are display apparatuses of word processors or personal computers. However, such a TN liquid crystal display apparatus presents a drawback in view of display quality in that reversals of tones are generated with respect to certain visual angles arid contrast values thus change. For the aim of improving the reliability of display quality on visual angles, it has been tried in Japanese Unexamined Patent Publication 76125/1996 to expand the visual angle by dividing display pixels into multiple regions. However, the region of visual angles in which reversals of tunes did not occur was only as large as ±40° to lateral directions and −20° to +10° in vertical directions, and thus insufficient for actual use.

There are recently being suggested in-plane switching liquid crystal display apparatuses which completely differ from TN type liquid crystal display apparatuses in their driving methods, examples of which are disclosed in "Nikkei Micro Devices" by Nikkei BP, December 1995 edition, P.130 to 135, or in "Collection of Preliminary Drafts of the Semicom Kansai 96 FPD Technical Seminar" by SEMI Japan, May 30, 1996, P. 3 to 23, 3 to 27 and P. 4 to 19, 4 to 21. Since liquid crystal molecules are to be switched to an electric field in a plane parallel with respect to the substrate, there are fewer variations in display property depending on visual angles than compared to TN liquid crystal display apparatuses and thus are of favorable display property.

FIG. 13 is a partial explanatory view of a conventional in-plane switching liquid crystal display apparatus which is formed by using liquid crystal which are of positive dielectric anisotropy. In FIG. 13, there are shown, from among components of the liquid crystal display apparatus, an electrodes substrate, two types of comb-like shaped electrodes (hereinafter referred to as "comb-like electrodes") formed on the electrodes substrate, and liquid crystal molecules (only four of those are shown in the drawings) which are included in the counter substrate and a liquid crystal layer, which together constitute a liquid crystal panel. As shown in FIG. 13, the electrodes substrate 2 with the comb-like electrodes 1 is disposed parallel to counter substrate 3, and between the electrodes substrate 2 and the counter substrate 3, there exists a liquid crystal layer including liquid crystal molecules 4 which are oriented substantially in parallel directions with respect to a longitudinal direction of the comb-like portions of the comb-like electrodes 1.

Next, the display theory of the liquid crystal display apparatus will be explained based on FIG. 14. FIG. 14 is a partial explanatory view showing the in-plane switching liquid crystal display apparatus. In FIG. 14, there are only shown a liquid crystal panel and two polarizers from among components of the liquid crystal display apparatus, and of the liquid crystal panel, there are only shown an electrodes substrate, respective comb-teeth portions of two types of comb-like electrodes (one each of each comb-teeth portion), a counter substrate, and liquid crystal molecules (only seven of these are shown in the drawings) included in the liquid crystal layer. In FIG. 14, numeral 1a denotes a first comb-like electrode, 1b a second comb-like electrode, numeral 2 an electrodes substrate, numeral 3 a counter substrate, numeral 4 liquid crystal molecules in the liquid crystal layer, numeral 5 a first polarizer, arid numeral 6 a second polarizer. As shown in the drawings, the first polarizer 5 is disposed such that a longitudinal direction of the liquid crystal molecules 4 (a direction indicated by "N" in the drawings) is parallel to a transmission axis O of the first polarizer 5, and the second polarizer 6 is disposed such that a transmission axis P of the second polarizer 6 is orthogonal with respect to the transmission axis O of the first polarizer 5. It should be noted that the aligning direction (a direction indicated by "Q" in the drawings) of alignment layers (not shown) formed on surfaces of the electrodes substrate 2 and the counter, substrate 3 are parallel with respect to transmission axes O, P of the first polarizer 5 and the second polarizer. The thickness of the liquid crystal layer is defined as d. Further, the transmission axes are parallel with respect to an oscillating direction of light that has passed through the polarizer.

In case the electric field is OFF (that is, no electric field is generated between the first comb-like electrode 1a and the second comb-like electrode 1b), the oscillating direction of an incident linear polarized light, that has passed through the first polarizer 5, is parallel to the aligning direction of the liquid crystal molecules, and since it is not affected by birefringence at the time of passing through the liquid crystal layer, the oscillating direction $R_1$ of light passing through the counter substrate 3 is made orthogonal to the transmission axis P of the second polarizer 6, and light that has passed through the counter substrate 3 being impossible of passing through the polarizer 6, a dark condition is obtained. It should be noted that since no outgoing transmission light exists in dark conditions, arrow $I_1$ is indicated as a broken line in the drawings.

In case the electric field is ON (that is, an electric field 1c is generated between the first comb-like electrode 1a and the second comb-like electrode 1b), the liquid crystal molecules 4 rotate in a direction of the electric field (note that the degree of rotation depends on the size of the electric field) while maintaining a parallel orientation (or alignment) with respect to the electrodes substrate 2 and the counter substrate 3. Therefore, the incident linear polarized light is affected by birefringence, changes into an elliptical polarization $R_2$, and a predetermined amount of light passes through the second polarizer 6. It should be noted that the amount of light passing through the second polarizer 6 is dependent on inclinations of liquid crystal molecules in a longitudinal direction (a direction indicated by "T" in the drawings). Here, the rotating angle θ is expressed by applied voltage (V). In this manner, display is performed by performing ON/OFF operations of applied voltage to the first comb-like electrode and the second comb-like electrode.

The strength of transmission light I is given by equation (1).

$$I = I_0 \sin^2(\pi R/\lambda) \sin^2 2\theta(V) \tag{1}$$

where $I_0$ represents the strength of incident light to the first polarizer 5, λ a wavelength of incident light, and R retardation which is expressed by optical-path difference of ordinary light and extraordinary light ($\Delta n$) ·d, where $\Delta n$ is an absolute value (|no-ne|) of a difference between a refractive index of ordinary light no and refractive index of extraordinary light ne of liquid crystal.

As it is evident from equation (1), intensity of the transmission light becomes maximum when $\theta=\pi/4$. Further, intensity of the transmission light outgoing from the second polarizer 6 is expressed by a function of a wavelength of incident light $\lambda$ and retardation R.

FIG. 15 is a graph showing dependence of transmittance on wavelength of various retardation values R (R=200 nm, 275 nm, 300 nm) in case of $\theta=\pi/4$. In FIG. 15, the vertical axis represents the transmittance (%) and the lateral axis represents the wavelength $\lambda$ (nm). With transmittance, it is meant a ratio of the amount of light that has passed through the second polarizer to the amount of light that is incident on the first polarizer. In FIG. 15, the dependency of transmittance on wavelength in case the retardation value R is 200 nm is shown by a solid line, the dependence of transmittance on wavelength in case the retardation value R is 275 nm is shown by a broken line, and the dependence of transmittance on wavelength in case the retardation value R is 300 nm is shown by a two-dot chain line. It is evident from FIG. 15 that the dependence of transmittance on wavelength is largely effected by retardation values.

FIG. 16 is an explanatory view showing an alignment condition of liquid crystal molecules of a conventional in-plane switching liquid crystal display apparatus. In the in-plane switching liquid crystal display apparatus, each of the liquid crystal molecules 4 are aligned in a direction denoted by numeral 22 with respect to the electrodes substrate 2 and counter substrate 3, respectively, at pretilt angles 13 each directed into different directions. This alignment condition is defined as parallel alignment. Pretilt angle 13 indicates an inclination of the liquid crystal molecules 4 in a longitudinal direction 4a with respect to the surface of the electrodes substrate 2 (or the counter substrate 3).

In this case, the refractive index anisotropy of the liquid crystal layer differs in case the liquid crystal panel is looked at from the direction with respect to the surface of the counter substrate 3 and in case when the liquid crystal panel is looked at from direction b, since the liquid crystal molecules 4 are aligned at parallel alignment at their pretilt angles 13, whereby the retardation value R that is obtained by multiplying birefringence rate $\Delta n$ by cell gap d (that is, $\Delta n \cdot d$) is varied. This, in turn, resulted in variations in dependence of transmittance on wavelength, and caused degradations in display quality since the display was colored blue (wavelength 440 nm) when looked at from a certain angle, and yellow (wavelength 580 nm) when looked at from another direction. Further, it was also presented a drawback in that the display property depending on visual angles became asymmetric with respect to the front of the liquid crystal panel, so that the display quality was degraded. In other words, while property dependent on visual angles were improved in conventional in-plane switching liquid crystal display apparatuses than compared to TN liquid crystal display apparatuses, there still remains problems that depending on visual angles, coloring occurred or display property varied.

SUMMARY OF THE INVENTION

The present invention has been made with the aim of restricting coloring and degradations in display quality depending on visual angles, and it is an object thereof to provide an in-plane switching liquid crystal display apparatus in which degradations of display quality such as coloring which are dependent on visual angles hardly occur.

The liquid crystal display apparatus according to claim 1 of the present invention is a liquid crystal display apparatus comprising:

(1) a liquid crystal panel including an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying predetermined electric signals to the pixel electrodes and the counter electrodes, wherein inclining directions of liquid crystal molecules which are closest to the electrodes substrate and those of liquid crystal molecules which are closest to the counter substrate are identical, and aligning directions of liquid crystal molecules which are closest to the electrodes substrate and those of liquid crystal molecules which are closest to the counter substrate are parallel to each other.

In the liquid crystal display apparatus according to claim 2 of the present invention, the pixel electrodes and counter electrodes are comb-like electrodes.

In the liquid crystal display apparatus according to claim 3 of the present invention, the pixel electrodes and counter electrodes are comb-like electrodes, and longitudinal directions of comb-teeth portions of the comb-like electrodes are aligned to be parallel to each other.

The liquid crystal display apparatus according to claim 4 of the present invention is a liquid crystal display apparatus comprising:

(1) a liquid crystal panel including an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying predetermined electric signals to the pixel electrodes and the counter electrodes, wherein a display region of the liquid crystal panel includes a plurality of pixels that are arranged in a form of a matrix, and each of the pixels are divided into a plurality of regions in which aligning directions of liquid crystal molecules are different from each other.

In the liquid crystal display apparatus according to claim 5 of the present invention, the pixel electrodes and counter electrodes are comb-like electrodes.

In the liquid crystal display apparatus according to claim 6 of the present invention, the pixel electrodes and counter electrodes are comb-like electrodes, and longitudinal directions of comb-teeth portions of the comb-like electrodes are aligned to be parallel to each other.

The liquid crystal display apparatus according to claim 7 of the present invention is a liquid crystal display apparatus comprising:

(1) a liquid crystal panel including an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying specified electric signals to the pixel electrodes and the counter electrodes, wherein an optical compensation layer is provided on a surface of the liquid crystal panel facing to persons looking thereat.

In the liquid crystal display apparatus according to claim 8 of the present invention, the pixel electrodes and counter electrodes are comb-like electrodes.

In the liquid crystal display apparatus according to claim 9 of the present invention, the pixel electrodes and counter electrodes are comb-like electrodes, and longitudinal directions of comb-teeth portions of the comb-like electrodes are aligned to be parallel to each other.

BRIEF DESCRIPTION OF THE DRAWINGS

FIG. 8 is a graph showing displaying property of the liquid crystal display of the present invention;

FIG. 14 is another example of conventional in-plane switching liquid crystal display apparatus;

DETAILED DESCRIPTION

Embodiments of the liquid crystal display apparatus of the present invention will now be explained.

EMBODIMENT 1

Embodiment 1 of the liquid crystal display apparatus of the present invention will now be explained with reference to the drawings.

The liquid crystal display apparatus of the present invention includes a liquid crystal panel, a driving circuit and a back light. The liquid crystal panel is composed of an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes. Since the pixel electrodes and counter electrodes are comb-like electrodes, voltage can be more effectively applied on the liquid crystal molecules, and since longitudinal directions of comb-teeth portions of the comb-like electrodes are aligned to be parallel to each other, voltage can be uniformly applied on the liquid crystal molecules. The driving circuit supplies predetermined electric signals to the pixel electrodes and counter electrodes. The back light is a light source which is provided in a rear side of the liquid crystal panel (for instance, on a surface facing the electrodes substrate). The above described arrangement of the liquid crystal display apparatus is common to all of the preceding embodiments.

Figure 1:
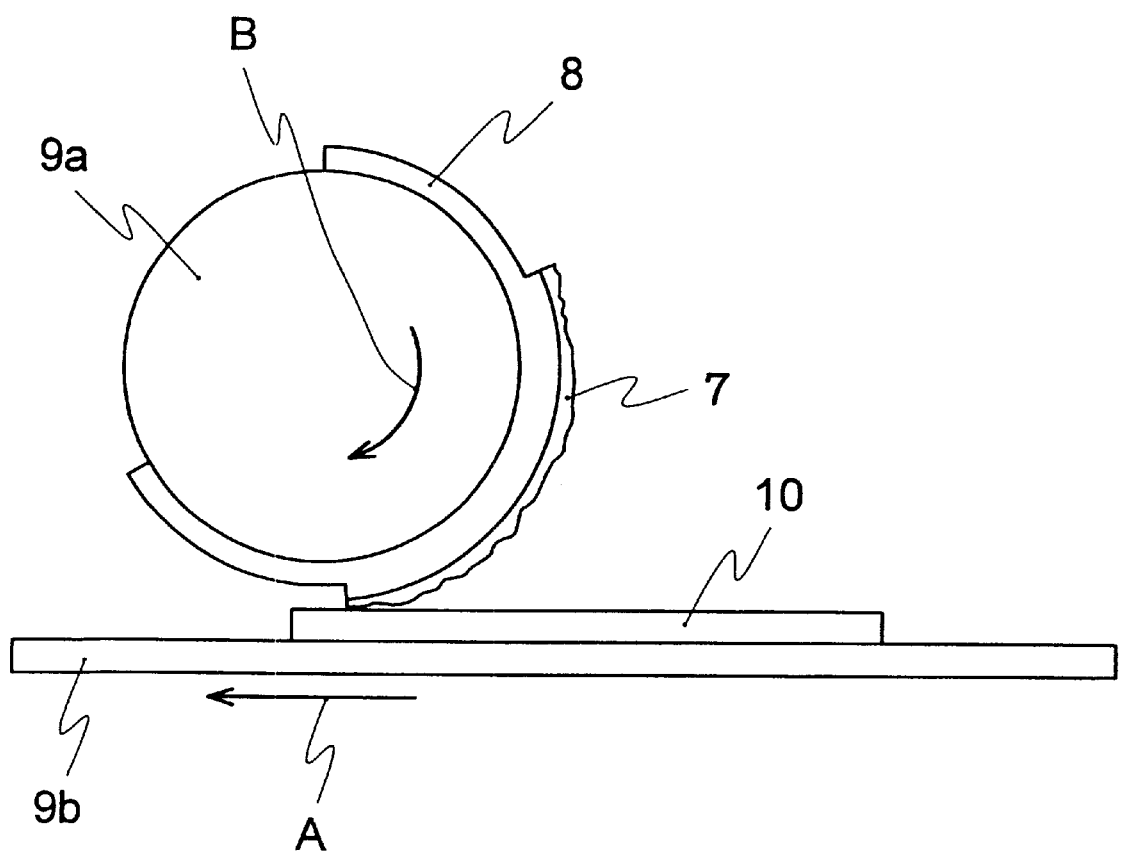
FIG. 1 is an explanatory view showing a substrate constituting a liquid cry display apparatus of the present invention, and showing a part of a device for providing alignment layer on the substrate.

In this embodiment, in forming the liquid crystal display apparatus, alignment layers (AL5417, manufactured by Japan Synthetic Rubber Co., Ltd.) were formed through transferring method onto predetermined regions of a TFT substrate and CF (color filter) substrate to assume a thickness of 700 Å, and baking was performed in an oven at 180° C. for 1 hour. FIG. 1 is an explanatory view showing a substrate on which an alignment layer is formed during the alignment layer transferring process and a part of a device which provides the alignment layer. In a transferring method, an alignment layer 7 is applied onto a surface of a letterpress like transferring plate 8 that is wound around a roller 9a, and by rotating the roller 9a at a speed identical with a moving speed of a substrate (electrodes substrate or counter substrate) 10 placed upon a supporting table 9b, the alignment layer 7 is transferred onto substrate 10. It should be noted that the substrate 10 moves in a direction shown by arrow A, and the roller 9a rotates in a direction shown by arrow B. Alignment layers used herein may be arbitrarily selected from commercially available alignment films for liquid crystal.

Figure 2:
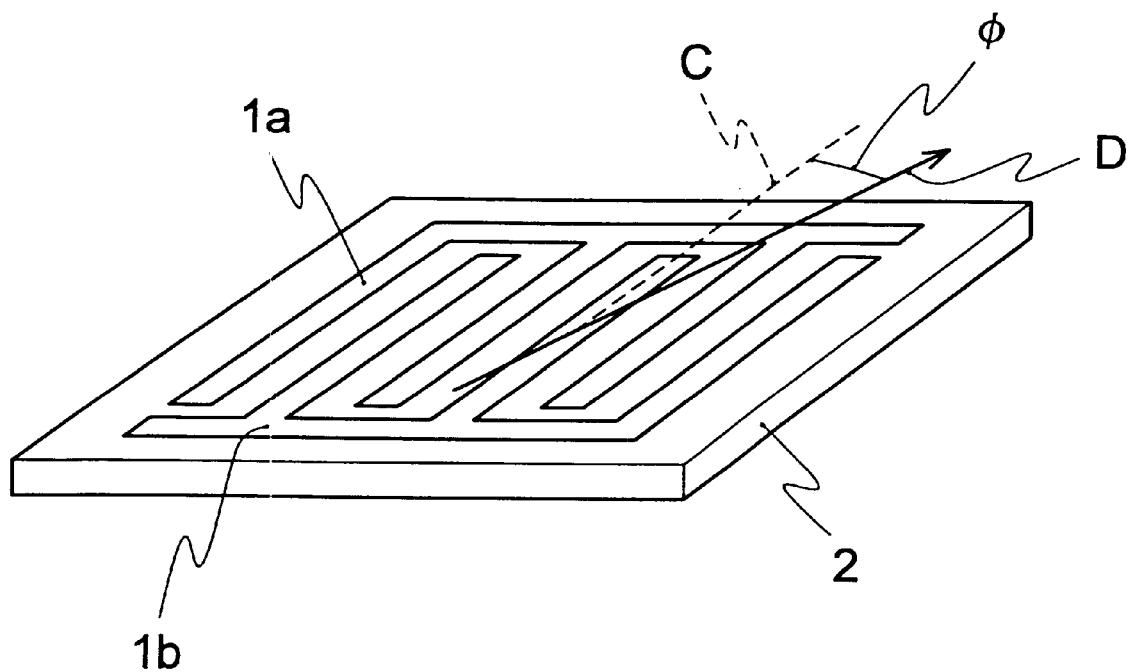
FIG. 2 is an explanatory view showing a part of an electrode substrate constituting a liquid crystal display apparatus of the present invention.

FIG. 2 is an explanatory view showing a part of the electrodes substrate. After performing the alignment layers transferring process, a rubbing process was performed wherein rubbing was performed in a rubbing direction which is direction D in which angle φ is inclined by 10° with respect to longitudinal directions of comb-teeth portions of a first comb-like electrode 1a and a second comb-like electrode 1b. Rubbing is a method in which aligning directions of liquid crystal molecules are made uniform by rubbing the alignment layer 7 on the surface of the substrate 10 placed upon the supporting table 12b while rotating a drum 12a around which a rubbing cloth 11 is wound at a speed of several hundred times per minute. It should be noted that the substrate 10 moves in a direction shown by arrow E, and the drum 12a rotates in a direction shown by arrow F. The rubbing cloth is a short-haired velvet-like cloth made, for instance, of rayon or cotton.

Figure 5:
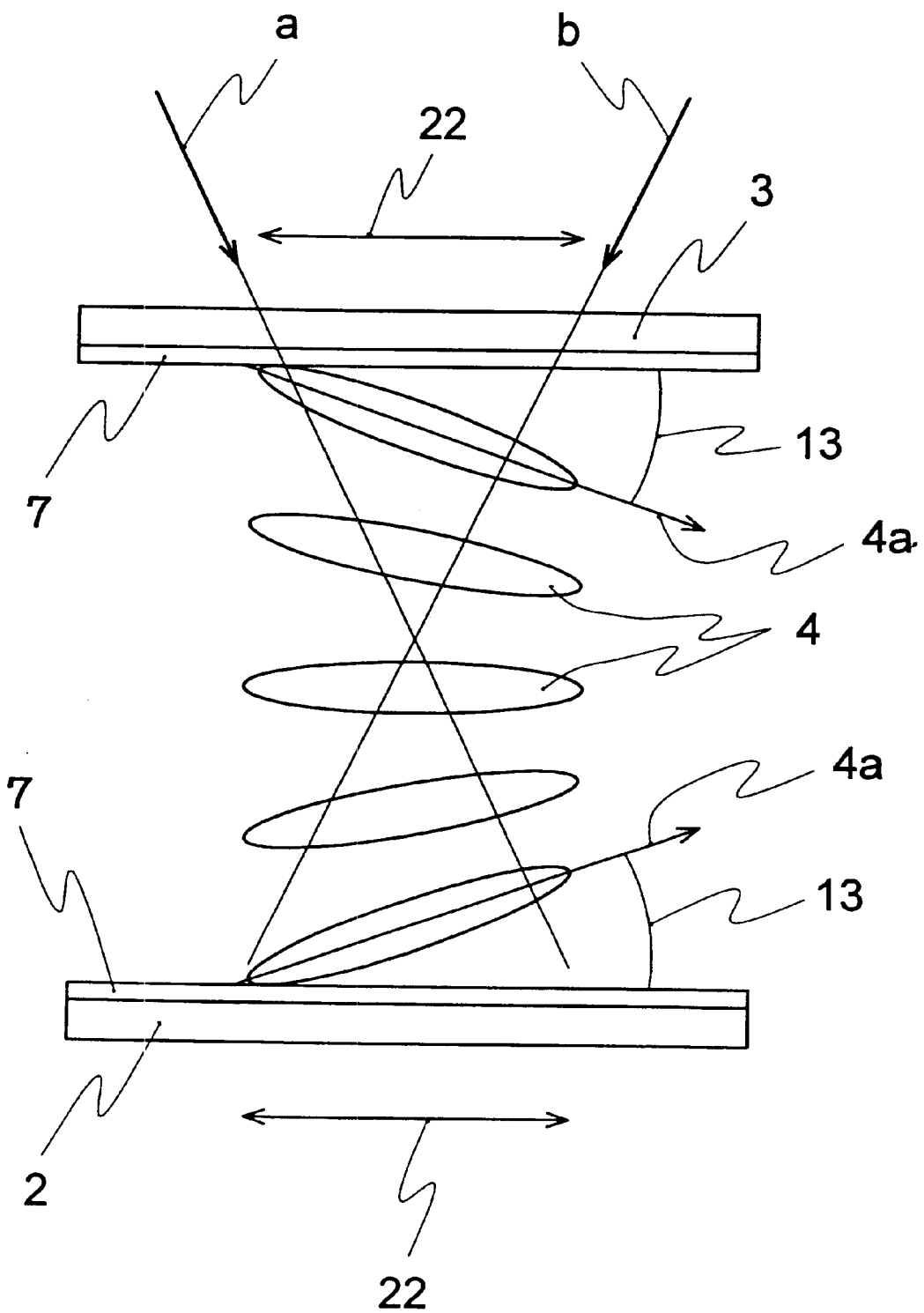
FIG. 5 is an explanatory view showing an alignment condition of liquid crystal molecules of liquid crystal display apparatus of the present invention.

In case a liquid crystal panel was formed by using the electrodes substrate and counter substrate which were provided with alignment layers in the above alignment layer transferring process and rubbing process, the pretilt angle of the liquid crystal molecules became 4°. It should be noted that a pretilt angle 13 is an inclination of the liquid crystal molecules 4 in a longitudinal direction 4a with respect to rubbing direction 22, as shown in FIG. 5. Note that FIG. 5 is an explanatory view showing alignment conditions of liquid crystal molecules in the liquid crystal display apparatus of the present invention. In FIG. 5, portions that are identical with those of FIG. 16 have been marked with the same reference numerals.

Figure 4A:
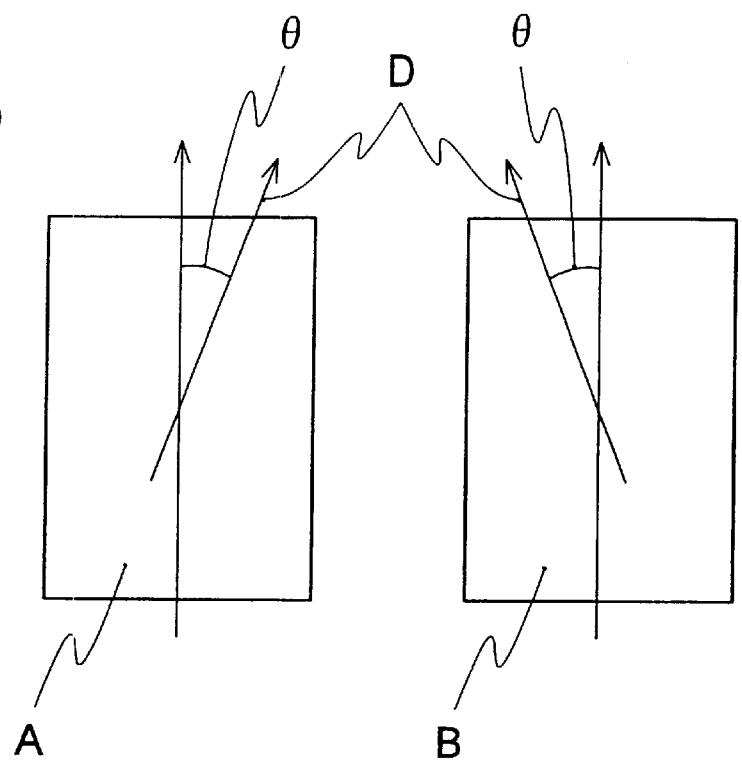
FIGS. 4(a) to 4(c) are explanatory views of processes for indication rubbing directions and method of overlapping.
Figure 4B:
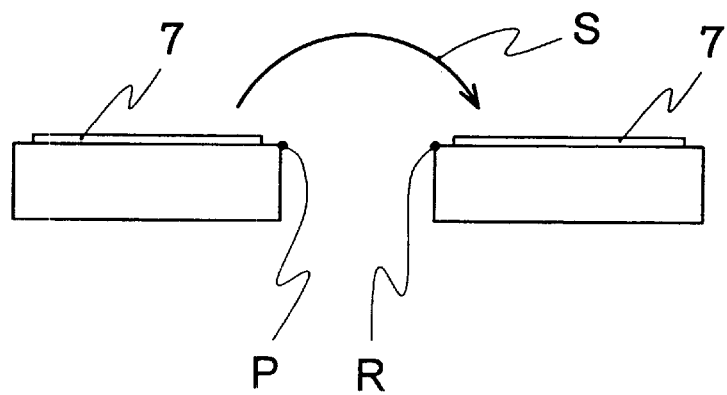
Figure 4C:
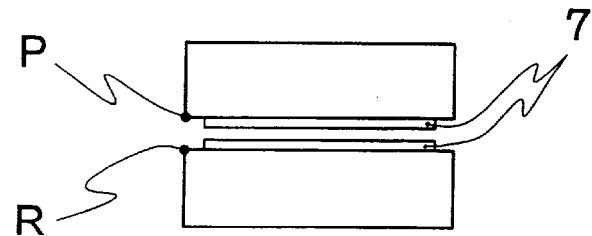

Thereafter, spacers which are for maintaining a space between the substrates at a specified size were mixed into a mixed solution of water: ethanol=1:1 (volumetric ratio), and were scattered onto either of the electrodes substrate and counter substrate through atomizing. In order to form a seal pattern for determining a liquid crystal enclosing region on the other substrate, a sealing agent was applied by using a dispenser to form a predetermined pattern and was heated and dried at 100° C. for 10 minutes. It should be noted that the substrate for scattering spacers and for applying the sealing agent may be either of the electrodes substrate and the counter substrates. Outlines for overlapping both of the substrates will now be explained based on FIGS. 4(a) to 4(c). FIGS. 4(a) to 4(c) are explanatory views of processes for indicating rubbing directions and methods of overlapping. FIG. 4(a) is a plan view of the substrate, and FIGS. 4(b) and (c) are explanatory views of side surfaces of the substrate, wherein θ in the drawings is an angle indicating rubbing direction D, and P and R indicate turning points at the time of overlapping. As shown in FIG. 4(a), substrates A and B for which rubbing has been performed were overlapped with each other such that points P and R are positioned at coincident portions after the overlapping as shown in FIG. 4(c), for instance, by turning substrate A as to rotate around point P to be overlapped with substrate B, as shown by arrow S in FIG. 4(b) of the drawings.

Then, the electrodes substrate and counter substrate could be overlapped with each other such that their rubbing directions or pixels are coincident. Thereafter, by applying pressure onto the overlapped electrodes substrate and the counter substrate at a pressure of 0.5 kgf/cm² at 150° C. for 1 hour, the cell gap (space between the electrodes substrate and counter substrate) was set to be 4.0 μm.

At this time, the electrodes substrate 2 and counter substrate 3 were overlapped with each other such that the aligning directions 13 of the liquid crystal molecules were at so-called anti-parallel alignment as shown in FIG. 5 in which inclining directions of liquid crystal molecules with respect to the pretilt angle are identical with each other. An anti-parallel alignment is an alignment for the liquid crystal in which aligning directions of each of the liquid crystal molecules 4 adjacent to the counter substrate 3 or the electrodes substrate 2 (rubbing direction 22) are identical with each other and absolute values of pretilt angles 13 are substantially equal.

Figure 6A:
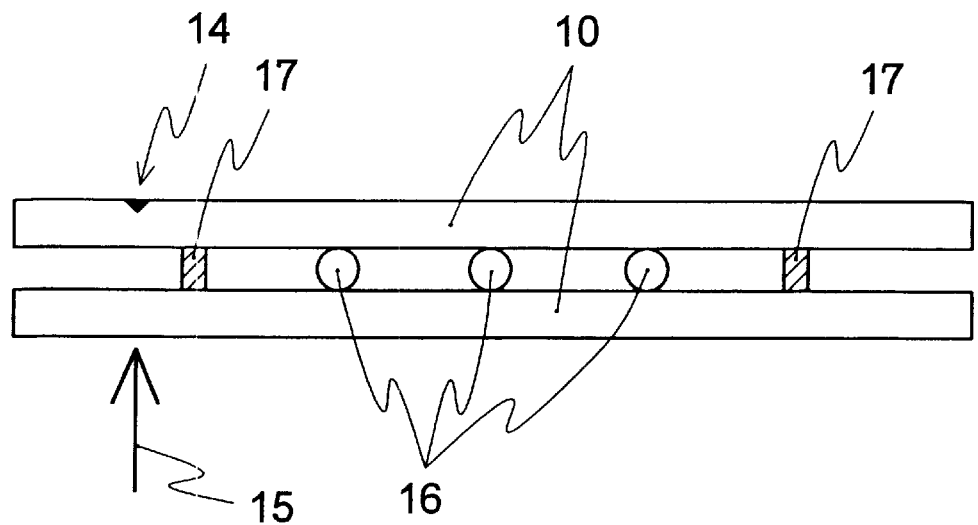
FIGS. 6(a) and 6(b) are sectional explanatory view showing a liquid crystal panel constituting a liquid crystal apparatus of the present invention.
Figure 6B:
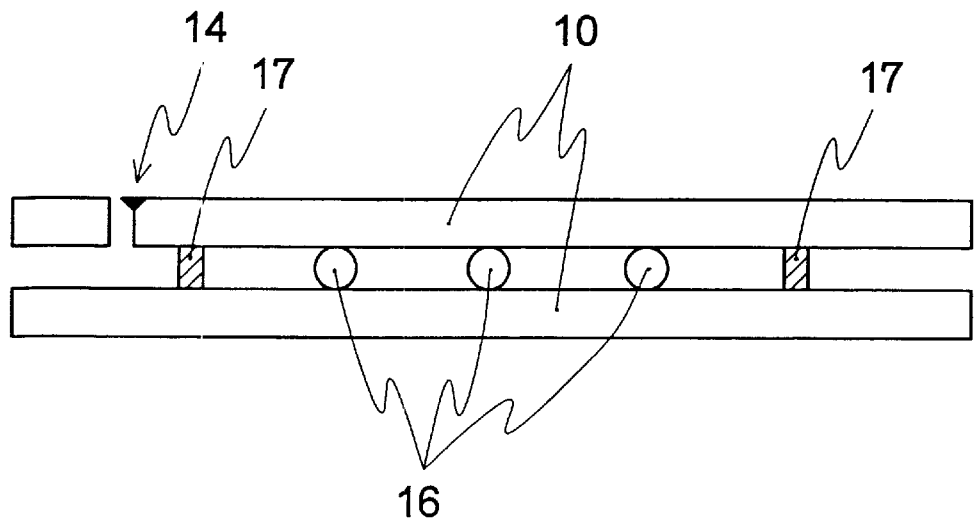

Further, as shown in FIGS. 6(a) and 6(b), a cutting line 14 was formed on the liquid crystal panel surface by using a glass scriber such that the liquid crystal panel assumed a predetermined size, and force 15 was applied to the cutting line portion from a side opposite to the surface on which the cutting line 14 was formed to cut the liquid crystal panel. FIGS. 6(a) and 6(b) are sectional explanatory view showing a liquid crystal panel comprising the liquid crystal apparatus of the present invention. In the drawings, numeral 10 denotes a substrate which is either the electrodes substrate or the counter substrate, numeral 16 spacers, and. numeral 17 a sealing member.

Figure 7A:
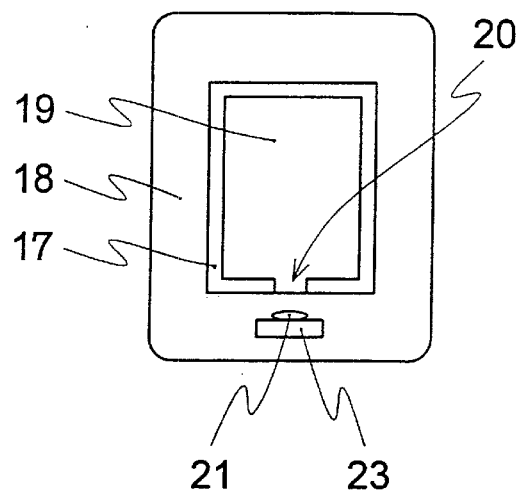
FIGS. 7(a) to 7(c) are explanatory views showing a liquid crystal panel and a vacuum chamber constituting a liquid crystal display apparatus of the present invention.
Figure 7B:
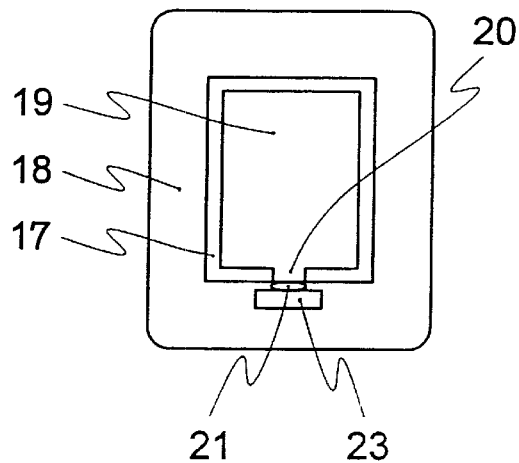
Figure 7C:
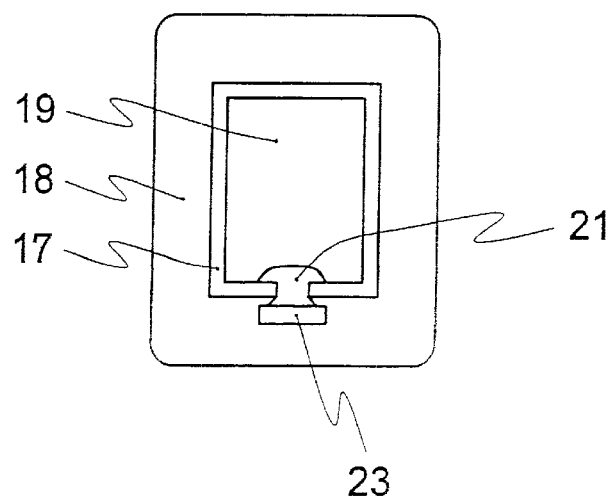

Then, liquid crystal 21 having a nematic phase was injected into the liquid crystal panel through vacuum injecting method as shown in FIGS. 7(a) to 7(c). In this vacuum injection method, the liquid crystal panel 19 and a predetermined amount of liquid crystal 21 contained in a vessel were disposed into a vacuum chamber 18 (see FIG. 7(a)), and the interior of the vacuum chamber 18 was made vacuum to be not more than $10^{-2}$ Torr. While maintaining the vacuum condition, injection inlet 20 and liquid crystal 21 were made to contact (see FIG. 7(b)), and by atmospheric release of the vacuum chamber 18 and utilizing the difference in pressure between the liquid crystal panel 18 and the peripheral pressure, liquid crystal 21 was injected from a liquid crystal vessel (liquid crystal plate) 23 which had preliminarily been filled with liquid crystal (see FIG. 7(c)). It should be noted that FIGS. 7(a) to 7(c) are explanatory views showing the vacuum chamber and the liquid crystal panel. At last, excessive liquid crystal 21 was removed by using a cloth (not shown), UV curing resin (not shown) was applied to the injection inlet 20 which was cured by irradiating ultraviolet light, and the injection inlet 20 was sealed. In this manner, a desired liquid crystal panel was manufactured.

While the pretilt angle is generally in the range of 0.5° to 20°, similar effects can be obtained regardless of the degree of the angle.

The smaller the difference between pretilt angles of liquid crystal molecules which are closest to the electrodes substrate 2 and those of liquid crystal molecules which are closest to the counter substrate 3 is, the more favorable it is.

FIG. 8 is a graph showing displaying property of the liquid crystal display apparatus of the present invention. In FIG. 8, the vertical axis represents retardation values, and the lateral axis visual angles. The visual angles are shown in that those in the right-hand side with respect to a longer side direction of the liquid crystal panel are (+), and those in the left-hand side (−). It should be noted that a solid line represents displaying property of a conventional liquid crystal display apparatus employing parallel alignment, and a one-dot chain line displaying properly of the liquid crystal display apparatus of the present invention employing anti-parallel alignment. A liquid crystal display apparatus obtained by using the liquid crystal panel formed as above described turned out to be different from a conventional liquid crystal display apparatus employing parallel alignment, and variations in retardation values owing to changes in visual angles could be restricted.

According to this embodiment, it is possible to obtain a liquid crystal display apparatus which presents fewer variations in colors depending on changes in visual angles and which has favorable displaying property.

EMBODIMENT 2

Embodiment 2 of the liquid crystal display apparatus of the present invention will now be explained with reference to the drawings.

In this embodiment, in forming the liquid crystal display apparatus, alignment layers (AL5417, manufactured by Japan Synthetic Rubber Co., Ltd.) were formed through transferring method onto predetermined regions of a TFT substrate and CF (color filter) substrate to assume a thickness of 700 Å, and baking was performed in an oven at 180° C. for 1 hour. The alignment layers may be arbitrarily selected from among commercially available alignment layers for liquid crystal.

Figure 9A:
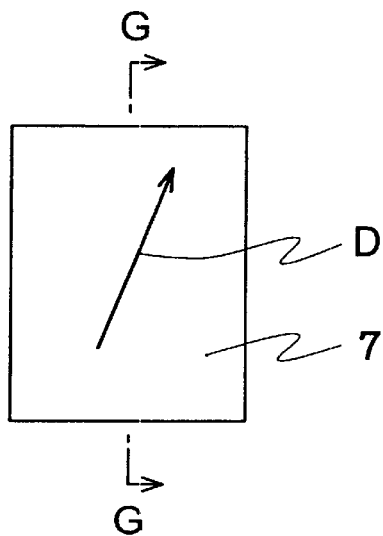
FIGS. 9(a) to 9(d) are explanatory views showing a substrate and an alignment layer of one pixel constituting a liquid crystal display apparatus of the present invention.

Thereafter, rubbing was performed for the alignment layers. FIGS. 9(a) to 9(d) are explanatory views showing a substrate comprising the liquid crystal panel and a single pixel of the alignment layer. FIG. 9(a) is an explanatory plan view showing a substrate and alignment layer of one pixel for which rubbing is to be performed for the first time, and FIG. 9(b) an explanatory view taken along line G—G of FIG. 9(a). Further, FIG. 9(c) is an explanatory plan view showing a substrate and alignment layers of one pixel for which rubbing is to be performed for the second time, and FIG. 9(d) a sectional explanatory view taken along line H—H of FIG. 9(c).

Figure 9B:
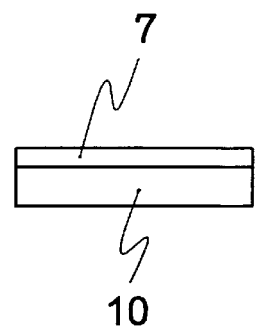
Figure 9C:
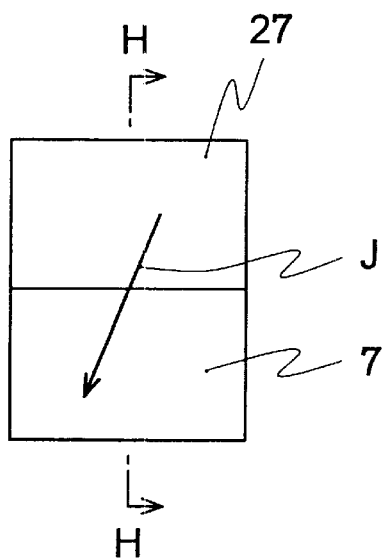
Figure 9D:
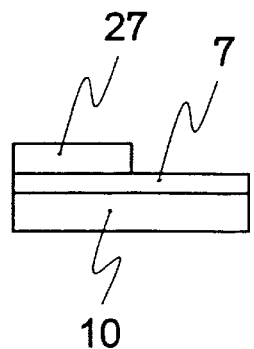

In the first rubbing process (see FIG. 9(a) and FIG. 9(b)), the rubbing direction was defined to be direction D as shown in FIG. 2 which is inclined by 10° with respect to a longitudinal direction C of comb-teeth portions of the first comb-like electrode 1a and second comb-like electrode 1b.

Then, a resist was applied and patterning was performed by employing a predetermined mask such that half of a single pixel was covered by the resist. Thereafter, rubbing was performed in direction J which is different from direction D as shown in FIG. 9(a) by 180° (see FIG. 9(c) and FIG. 9(d)). At this time, the portion which was covered by the resist 27 was not affected by rubbing whereby the initial alignment condition could be maintained. The portion which was not covered by the resist 27 was applied with a new aligning direction (which is parallel to a direction shown by "J" in the drawings) in the second rubbing process. At last, all of the resist was removed. In this manner, two regions were obtained in which aligning directions were different by 180° within one pixel.

A rubbing cloth is a short-haired velvet-like cloth of rayon or cotton.

At this time, the pretilt angles of the liquid crystal molecules with respect to the substrate was 4°.

Thereafter, spacers which are for maintaining a space between the substrates at a predetermind size were mixed into a mixed solution of water: ethanol=1:1 (volumetric ratio), and were scattered onto either of the electrodes substrate and counter substrate through atomizing. In order to form a seal pattern for determining a liquid crystal enclosing region on the other substrate, a sealing member was applied by using a dispenser to form a predetermind pattern and was heated and dried at 100° C. for 10 minutes. It should be noted that the substrate for scattering spacers and for applying the sealing agent may be either of the electrodes substrate and the counter substrates.

Then, the electrodes substrate and counter substrate were overlapped with each other such that their rubbing directions or pixels were coincident. Thereafter, by applying pressure onto the overlapped electrodes substrate and the counter substrate at a pressure of 0.5 kgf/cm² at 150° C. for 1 hour, the cell gap (space between the electrodes substrate and counter substrate) was set to be 4.0 μm.

Figure 16:
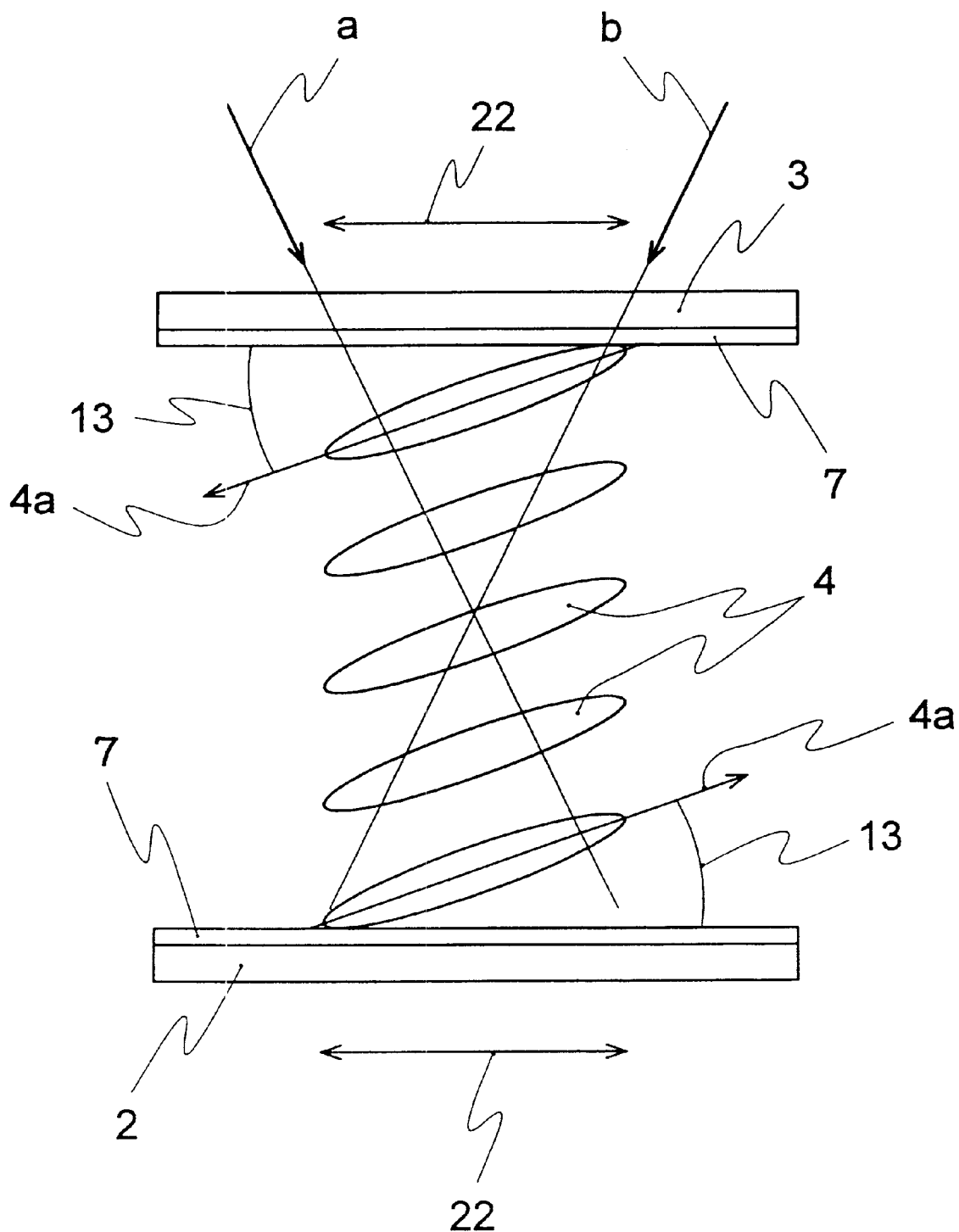
FIG. 16 is an explanatory view showing an alignment condition of liquid crystal molecules of the conventional in-plane switching liquid crystal display apparatus.

At this time, the electrodes substrate and counter substrate were overlapped with each other such that the aligning directions of the liquid crystal molecules were at parallel alignment as shown in FIG. 16.

Further, as shown in FIGS. 6(a) to 6(b), a cutting line 14 was formed on the liquid crystal panel surface by using a glass scriber such that the liquid crystal panel assumed a predetermined size, and force 15 was applied to the cutting line portion from a side opposite to the surface on which the cutting line 14 was formed to cut the liquid crystal panel.

Then, liquid crystal 21 having a nematic phase was injected into the liquid crystal panel through vacuum injecting method as shown in FIGS. 7(a) to 7(c). In this vacuum injection method, the liquid crystal panel 19 and a specified amount of liquid crystal 21 contained in a vessel were disposed into a vacuum chamber 18 (see FIG. 7(a)), and the interior of the vacuum chamber 18 was made vacuum to be not more than $10^{-2}$ Torr. While maintaining the vacuum condition, injection inlet 20 and liquid crystal 21 were made to contact (see FIG. 7(b)), and by atmospheric release of the vacuum chamber 18 and utilizing the difference in pressure between the liquid crystal panel 18 and the peripheral pressure, liquid crystal 21 was injected (see FIG. 7(c)).

At last, excessive liquid crystal 21 was removed by using a cloth (not shown), UV curing resin (not shown) was applied to the injection inlet 20 which was cured by irradiating ultraviolet light, and the injection inlet 20 was sealed. In this manner, a desired liquid crystal panel was manufactured.

Figure 10A:
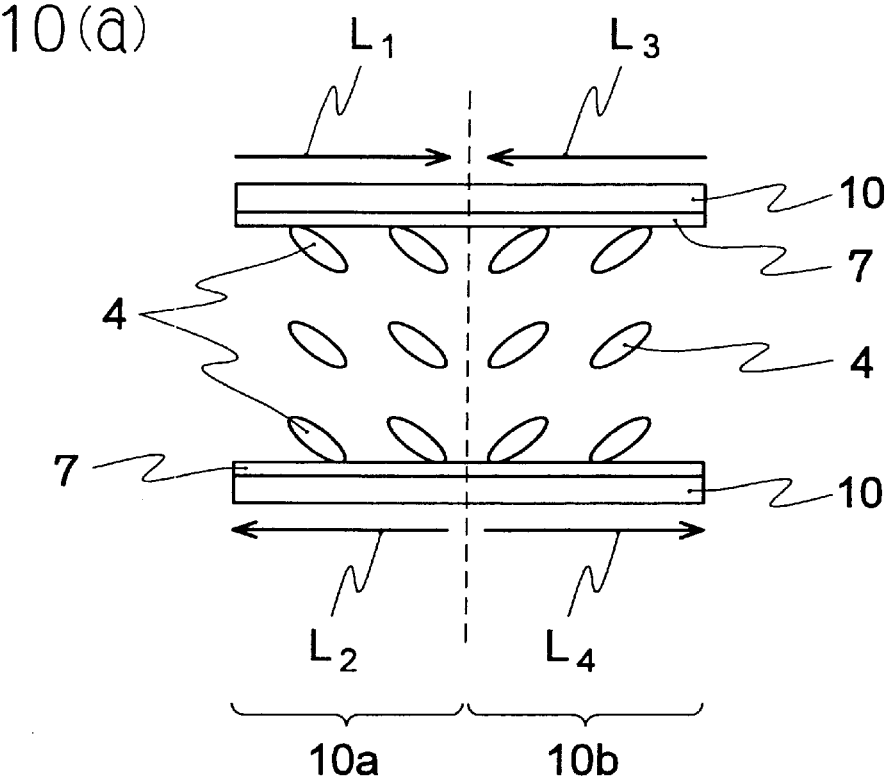
FIGS. 10(a) and 10(b) are explanatory views showing a liquid crystal panel constituting a liquid crystal display apparatus of the present invention.
Figure 10B:
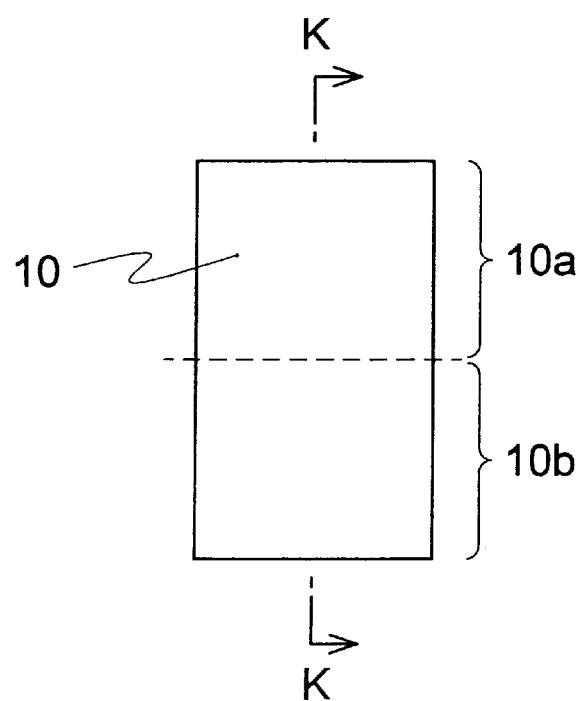

FIGS. 10(a) and 10(b) are explanatory views of a liquid crystal panel comprising the liquid crystal display apparatus of the present invention. FIG. 10(a) is a sectional explanatory view showing the liquid crystal panel, and FIG. 10(b) an explanatory plan view showing the liquid crystal panel. It should be noted that FIG. 10(a) is a sectional view of FIG. 10(b) taken along line K—K.

According to this embodiment, it was obtained a liquid crystal panel including a first region 10a (region in the left-hand side with respect to the broken line in FIG. 10(a)) with pixels having different aligning directions in a single pixel and a second region 10b (region in the right-hand side with respect to the broken line in FIG. 10(a)). The pretilt angles of liquid crystal molecules 4 of the first region 10a are different by 180° from the pretilt angles of liquid crystal molecules 4 of the second region 10b. Further, the rubbing direction for the substrate 10 on the upper side in the first region 10a is represented by arrow $L_1$, the rubbing direction for the substrate 10 on the lower side in the first region 10a is represented by arrow $L_2$, the rubbing direction for the substrate 10 on the upper side in the second region 10b is represented by arrow $L_3$, and the rubbing direction for the substrate 10 on the lower side in the second region 10b is represented by arrow $L_4$.

Figure 11:
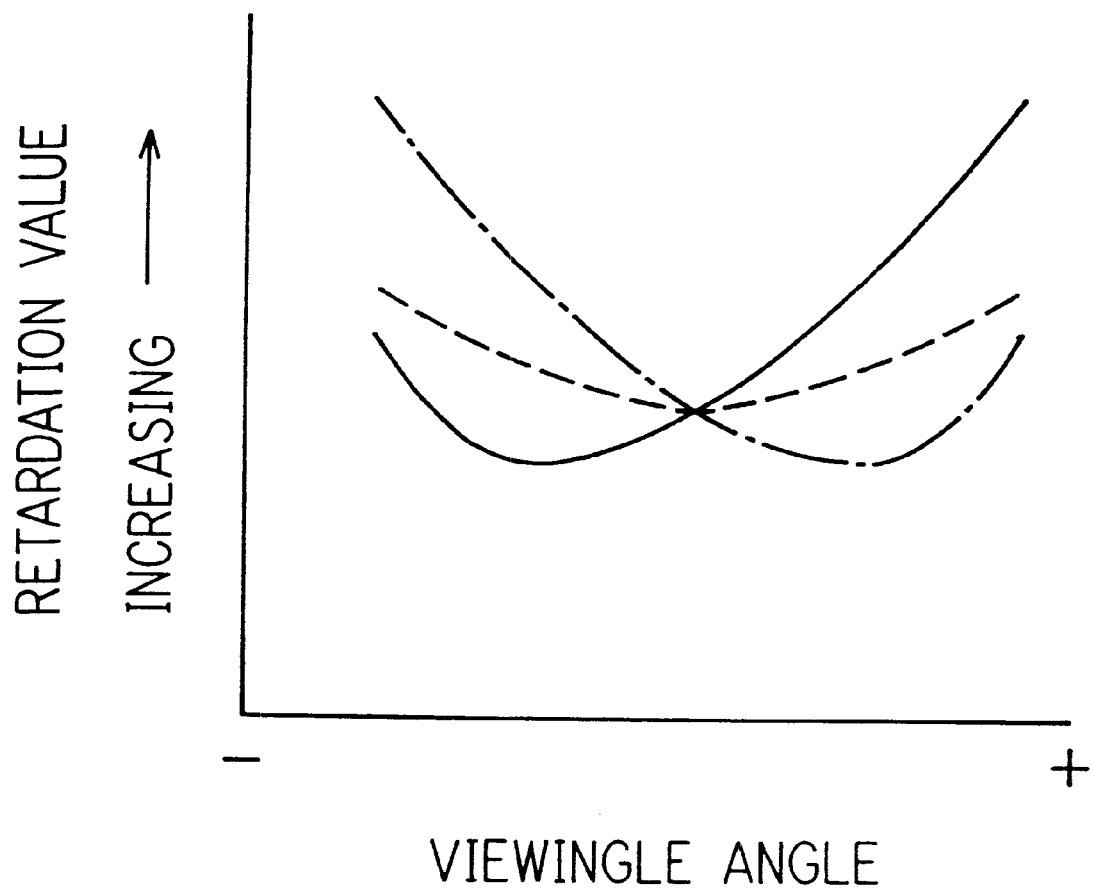
FIG. 11 is a graph showing a displaying property of the liquid crystal display apparatus of the present invention.

FIG. 11 is a graph showing display property of the liquid crystal display apparatus of the present invention. In FIG. 11, the vertical axis represents retardation values, and the lateral axis visual angles. It should be noted that a solid line represents display property of the first region, a one-dot chain line display property of the liquid crystal display apparatus of the second region, and a broken line average values of display property of the first region and those of the second region. In a liquid crystal display apparatus obtained by using the liquid crystal panel formed as above described, the dependency on visual angles of the first region and the dependency on visual angles of the second regions could be macroscopically averaged which was achieved by forming a plurality of regions within a single pixels having different aligning directions. Thus, variations in retardation values owing to changes in visual angles can be restricted.

According to this embodiment, it is possible to obtain a liquid crystal display apparatus which presents fewer variations in colors depending on changes in visual angles and which has favorable display property.

It should be noted that while two regions have been formed within a single pixel which rubbing directions were different from each other by 180°, it is not necessarily required to perform rubbing in 180° different directions to obtain similar effects.

Similar effects can also be achieved in case a single pixel is divided into 3 or more regions.

EMBODIMENT 3

Embodiment 3 of the liquid crystal display apparatus of the present invention will now be explained with reference to the drawings.

In this embodiment, in forming the liquid crystal display apparatus, alignment layers (AL5417, manufactured by Japan Synthetic Rubber Co., Ltd.) were formed through transferring method onto predetermined regions of a TFT substrate and CF (color filter) substrate to assume a thickness of 700 Å, and burning was performed in an oven at 180° C. for 1 hour. The alignment layers may be arbitrarily selected from among commercially available alignment layers for liquid crystal.

Figure 3:
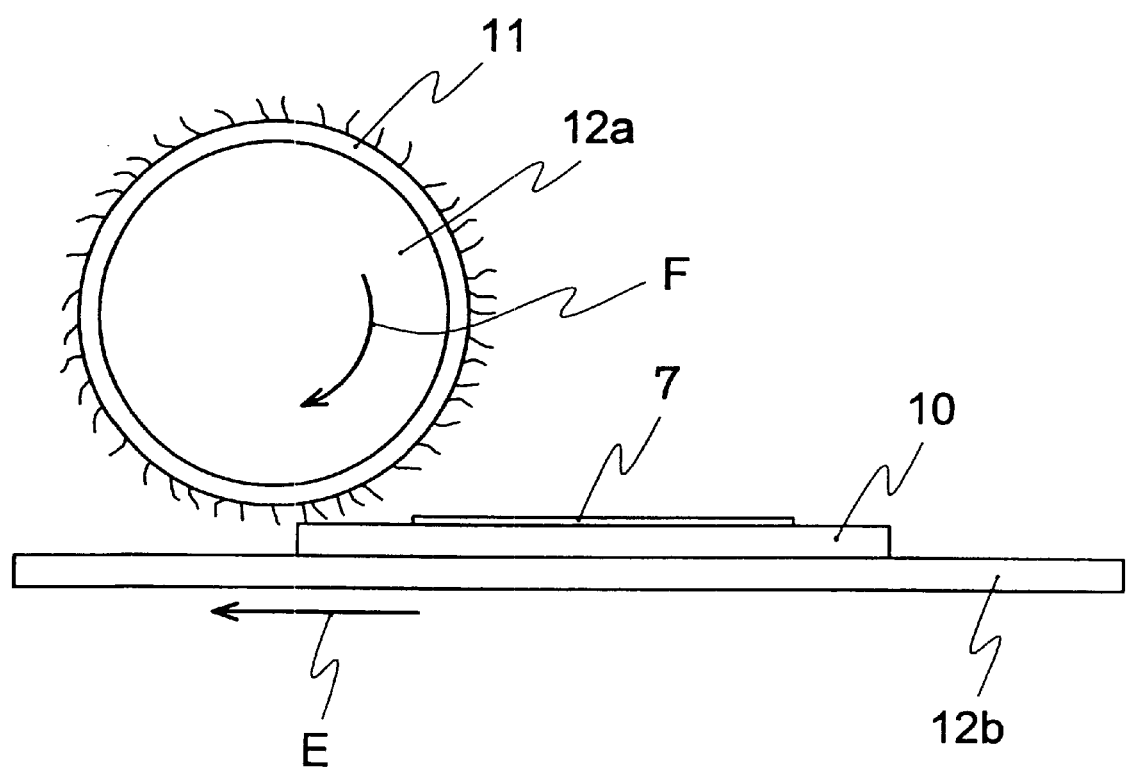
FIG. 3 is an explanatory view showing a substrate constituting a liquid crystal display device of the present invention, and showing a part of a device for subjecting the substrate to rubbing treatment.

Thereafter, rubbing was performed in rubbing direction which was defined to be direction D (see FIG. 2) which is inclined by 10° in a longitudinal direction C of comb-teeth portions of the first comb-like electrode 1a and second comb-like electrode 1b (see FIG. 3).

In case a liquid crystal display panel was formed by using the electrodes substrate and counter substrate provided with alignment layers through the above described alignment film transferring process and rubbing process, the pretilt angles of the liquid crystal molecules with respect to the substrate were 4°. It should be noted that pretilt angle 13 is an inclination of liquid crystal molecules 4 in a longitudinal direction 4a with respect to the rubbing direction 22.

Thereafter, spacers which are for maintaining a space between the substrates at a predetermined size were mixed into a mixed solution of water: ethanol=1:1 (volumetric ratio), and were scattered onto either of the electrodes substrate and counter substrate through atomizing. In order to form a seal pattern for determining a liquid crystal enclosing region on the other substrate, a sealing agent was applied by using a dispenser to form a predetermined pattern and was heated and dried at 100° for 10 minutes. It should be noted that the substrate for scattering spacers and for applying the sealing agent may be either of the electrodes substrate and the counter substrates.

Then, the electrodes substrate and counter substrate were overlapped with each other such that their rubbing directions or pixels were coincident. Thereafter, by applying pressure onto the overlapped electrodes substrate and the counter substrate at a pressure of 0.5 kgf/cm$^2$ at 150° C. for 1 hour, the cell gap (space between the electrodes substrate and counter substrate) was set to be 4.0 μm.

At this time, the electrodes substrate 2 and counter substrate 3 were overlapped with each other such that the aligning directions of the liquid crystal molecules were at anti-parallel alignment as shown in FIG. 6. An anti-parallel alignment is an alignment for the liquid crystal in which aligning directions of each of the liquid crystal molecules 4 adjacent to the counter substrate 3 or the electrodes substrate 2 (rubbing direction 22) are identical with each other and absolute values of pretilt angles 13 are substantially equal.

Further, as shown in FIGS. 6(a) and 6(b), a cutting line 14 was formed on the liquid crystal panel surface by using a glass scriber such that the liquid crystal panel assumed a predetermined size, and force 15 was applied to the cutting line portion from a side opposite to the surface on which the cutting line 14 was formed to cut the liquid crystal panel.

Then, liquid crystal 21 having a nematic phase was injected into the liquid crystal panel through vacuum injecting method as shown in FIGS. 7(a) to 7(c). In this vacuum injection method, the liquid crystal panel 19 and a predetermined amount of liquid crystal 21 contained in a vessel were disposed into a vacuum chamber 18 (see FIG. 7(a)), and the interior of the vacuum chamber 18 was made vacuum to be not more than 10$^{-2}$ Torr. While maintaining the vacuum condition, injection inlet 20 and liquid crystal 21 were made to contact (see FIG. 7(b)), and by atmospheric release of the vacuum chamber 18 and utilizing the difference in pressure between the liquid crystal panel 18 and the peripheral pressure, liquid crystal 21 was injected (see FIG. 7(c)). Then, excessive liquid crystal 21 was removed by using a cloth (not shown), UV curing resin (not shown) was applied to the injection inlet 20 which was cured by irradiating ultraviolet light, and the injection inlet 20 was sealed. In this manner, a desired liquid crystal panel was manufactured.

Figure 12:
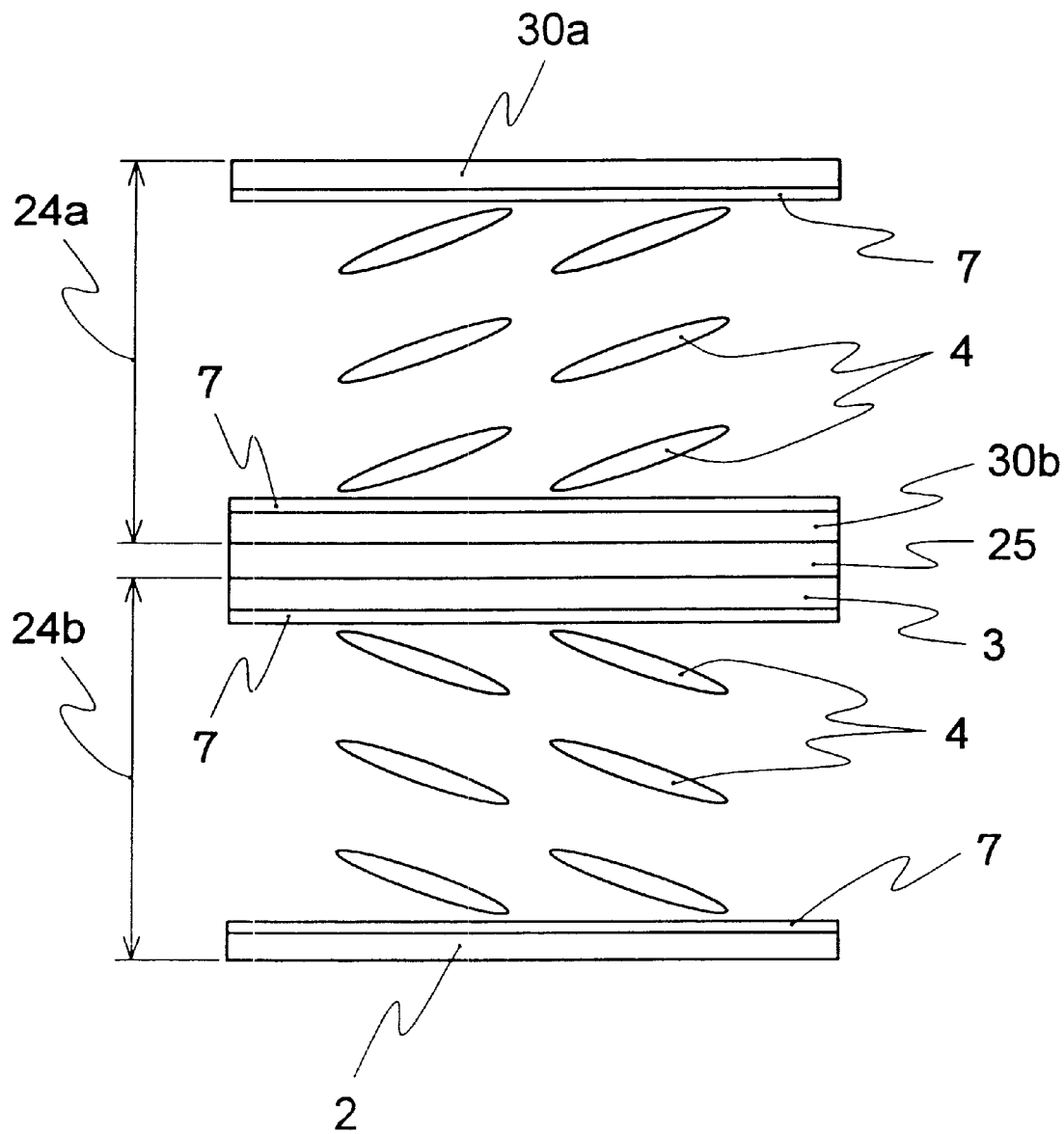
FIG. 12 is a sectional explanatory view showing an optical compensating layer and liquid crystal panel constituting a liquid crystal display apparatus of the present invention.
Figure 13:
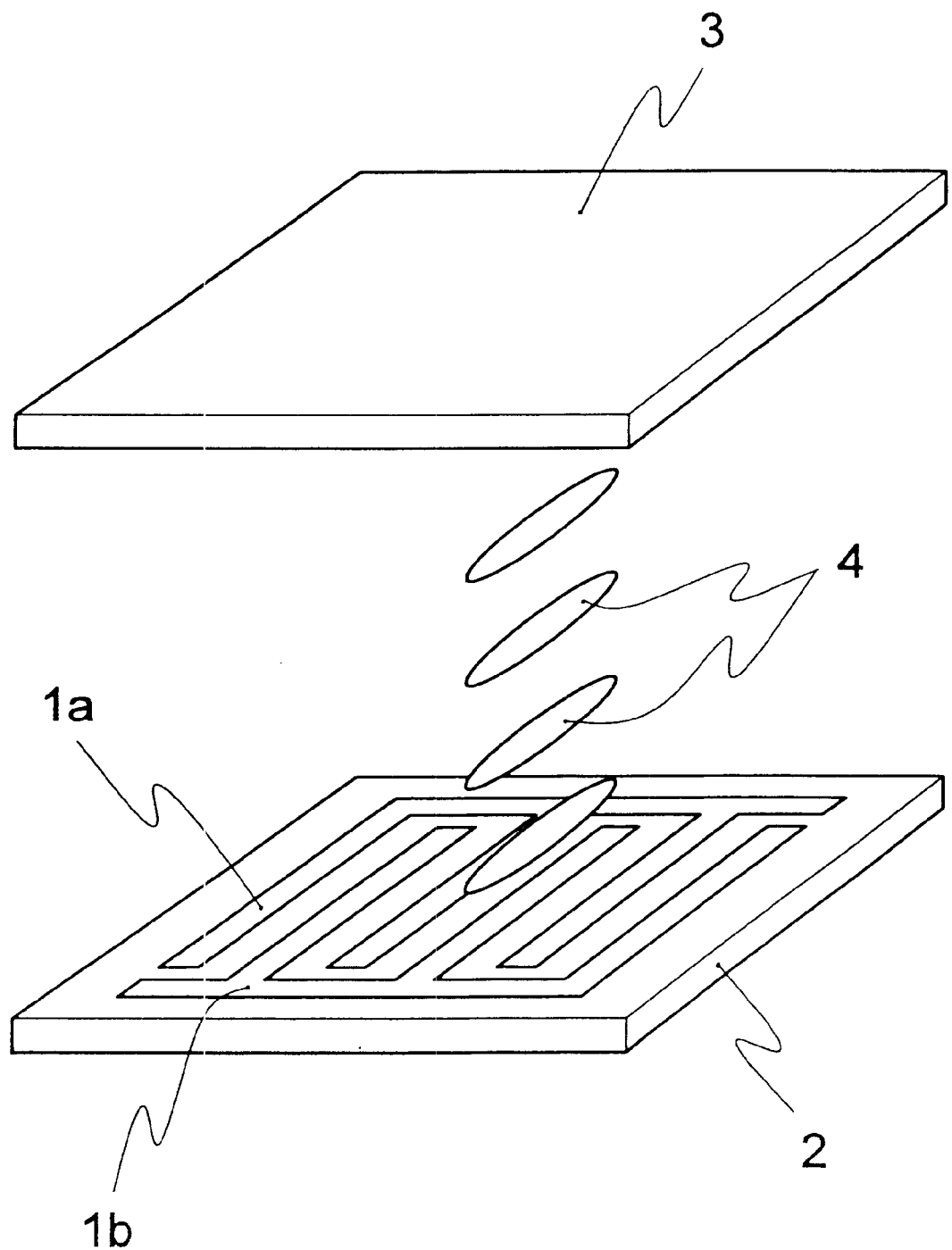
FIG. 13 is a partial explanatory view showing an example of conventional in-plane switching liquid crystal display apparatus.
Figure 15:
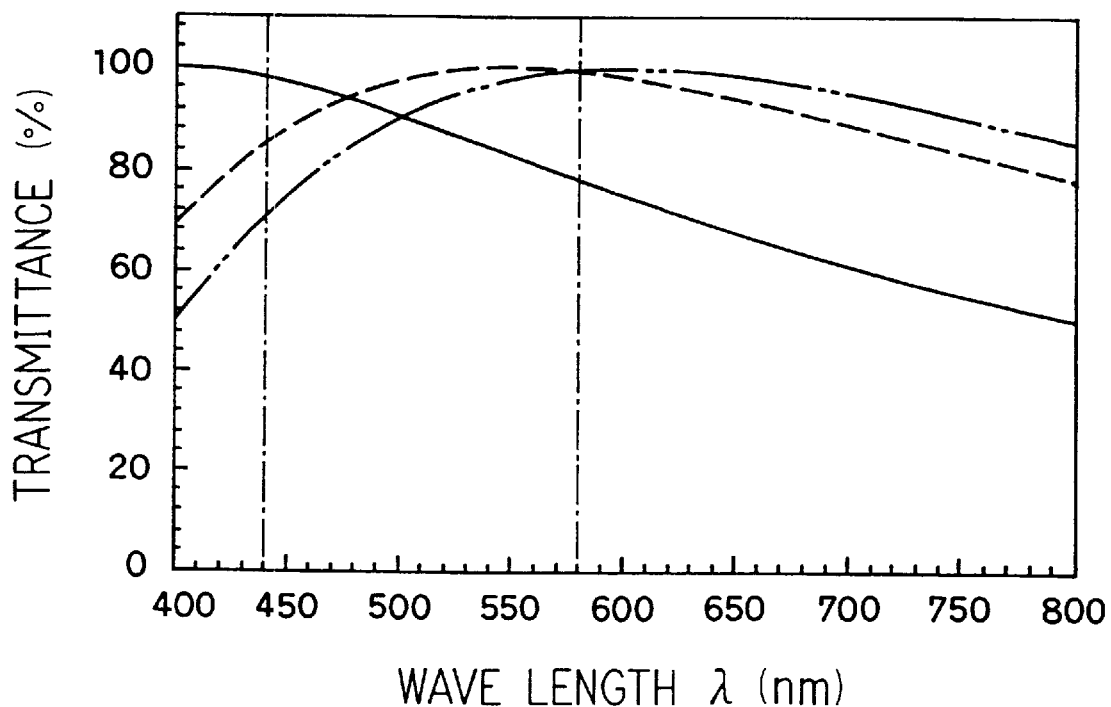
FIG. 15 is a graph showing a wavelength dependency of transmittance of the conventional liquid crystal display apparatus.

FIG. 12 is a sectional explanatory view showing an optical compensation layer and a liquid crystal panel comprising the liquid crystal display apparatus of the present invention. In FIG. 12, numeral 24a denotes an optical compensation layer, numeral 24b a liquid crystal panel. As shown in the drawings, by applying an adhesive 25 onto a surface of the liquid crystal panel 24b obtained in the above described manner and adhering the same to the optical compensation layer 24a, an optical compensation layer could be provided on a surface of the liquid crystal, panel facing a person looking thereat. For forming the optical compensation layer 24, glass substrates 30a, 30b have been employed and a panel comprising a liquid crystal layer obtained in a similar manner as the liquid crystal panel was rotated in a planar direction by 180° with respect to the liquid crystal panel. The refractive index of adhesive member 25 which was used for adhering the optical compensation layer 24a and the liquid crystal panel 24b together is preferably close to the refractive index of the adjoining glass substrate 30b (or counter substrate 3) in order to restrict reflection with the glass substrate 30b (or counter substrate 3).

By providing the above described optical compensation layer, variations in retardation values owing to visual angles could be restricted.

According to this embodiment, it is possible to obtain a liquid crystal display apparatus which presents fewer variations in colors depending on changes in visual angles and which has favorable display property.

Similar effects can be obtained by using commercially available optical compensation films.

The liquid crystal display apparatus according to claim 1 of the present invention is a liquid crystal display apparatus comprising:

(1) a liquid crystal panel including an electrodes substrate provided with pixel electrodes and counter electrodes, an counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying predetermined electric signals to the pixel electrodes and the counter electrodes, wherein inclining directions of liquid crystal molecules which are closest to the electrodes substrate and those of liquid crystal molecules which are closest to the counter substrate are identical, and aligning directions of liquid crystal molecules which are closest to the electrodes substrate and those of liquid crystal molecules which are closest to the counter substrate are parallel to each other. With this arrangement, it is possible to obtain a liquid crystal display apparatus which presents fewer variations in colors depending on changes in visual angles and which has favorable display property than compared to conventional in-plane switching liquid crystal display apparatuses.

In the liquid crystal display apparatus according to claim 2 of the present invention, the pixel electrodes and counter electrodes are comb-like electrodes. With this arrangement, voltage can be applied on the liquid crystal molecules in a more effective manner.

In the liquid crystal display apparatus according to claim 3 of the present invention, the pixel electrodes and counter electrodes are comb-like electrodes, and longitudinal directions of comb-teeth portions of the comb-like electrodes are aligned to be parallel to each other. With this arrangement, voltage can be uniformly applied on the liquid crystal molecules.

The liquid crystal display apparatus according to claim 4 of the present invention is a liquid crystal display apparatus comprising:

(1) a liquid crystal panel including an electrodes substrate provided with pixel electrodes and counter electrodes, counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes: and (2) a driving circuit for supplying predetermined electric signals to the pixel electrodes and the counter electrodes, wherein a display region of the liquid crystal panel is composed of a plurality of pixels that are arranged in a form of a matrix, and each of the pixels are divided into a plurality of regions in which alignment directions of liquid crystal molecules are different from each other. With this arrangement, it is possible to obtain a liquid crystal display apparatus which presents fewer variations in colors depending on changes in visual angles and which has favorable display property than compared to conventional in-plane switching liquid crystal display apparatuses.

In the liquid crystal display apparatus according to claim 5 of the present invention, the pixel electrodes and counter electrodes are comb-like electrodes. With this arrangement, voltage can be applied on the liquid crystal molecules in a more effective manner.

In the liquid crystal display apparatus according to claim 6 of the present invention, the pixel electrodes and counter electrodes are comb-like electrodes, and longitudinal directions of comb-teeth portions of the comb-like electrodes are aligned to be parallel to each other. With this arrangement, voltage can be uniformly applied on the liquid crystal molecules.

The liquid crystal display apparatus according to claim 7 of the present invention is a liquid crystal display apparatus comprising:

(1) a liquid crystal panel including an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes and;

(2) a driving circuit for supplying specified electric signals to the pixel electrodes and the counter electrodes, wherein an optical compensation layer is provided on a surface of the liquid crystal panel facing to persons looking thereat. With this arrangement, it is possible to obtain a liquid crystal display apparatus which presents fewer variations in colors depending on changes in visual angles and which has favorable display property than compared to conventional in-plane switching liquid crystal display apparatuses.

In the liquid crystal display apparatus according to claim 8 of the present invention, the pixel electrodes and counter electrodes are comb-like electrodes. With this arrangement, voltage can be applied on the liquid crystal molecules in a more effective manner.

In the liquid crystal display apparatus according to claim 9 of the present invention, the pixel electrodes and counter electrodes are comb-like electrodes, and longitudinal directions of comb-teeth portions of the comb-like electrodes are aligned to be parallel to each other. With this arrangement, voltage can be uniformly applied on the liquid crystal molecules.

What is claimed is:

1. A liquid crystal display apparatus comprising:

(1) a liquid crystal panel including an electrodes substrate provided with a comb-like pixel electrodes and comb-like counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supply predetermined electric signals to the pixel electrodes and the counter electrodes, wherein longitudinal directions of the comb-teeth portions of the comb-like pixel and counter electrode are aligned with each other, wherein rubbing directions of said two substrates are substantially equal so that the longitudinal axes of liquid crystal molecules are set substantially in parallel to the rubbing directions, and said rubbing directions are 10° with respect to said longitudinal direction of the comb-teeth portion of the comb-like electrodes, and wherein magnitudes of inclining directions of liquid crystal molecules which are closest to the electrodes substrate and those of liquid crystal molecules which are closest to the counter substrate are equal, and inclining directions of liquid crystal molecules located between the electrode and counter substrate are arranged in a splay pattern symmetric to a plane located midway between said electrode and counter substrates.

2. The liquid crystal display apparatus of claim 1, wherein the pretilt angle of the liquid crystal molecules is in the range between 0.5° and 20°.

3. A liquid crystal display apparatus comprising:

(1) a liquid crystal panel including an electrodes substrate provided with pixel electrodes and counter electrodes, counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying predetermined electric signals to the pixel electrodes and the counter electrodes, wherein a display region of the liquid crystal panel includes a plurality of pixels that are arranged in a form of a matrix, and each of the pixels are divided into a plurality of regions in which aligning directions of liquid crystal molecules are different from each other hand and substantially uniform within respective ones of each of said plurality of regions.

4. The liquid crystal display apparatus according to claim 3, wherein the pixel electrodes and counter electrodes are comb-like electrodes.

5. The liquid crystal display apparatus according to claim 4, wherein the pixel electrodes and counter electrodes are comb-like electrodes, and longitudinal directions of comb-teeth portions of the comb-like electrodes are aligned to be parallel to each other.

6. A liquid crystal display apparatus comprising:

(1) a liquid crystal panel including an electrodes substrate provided with pixel electrodes and counter electrodes, a counter substrate which opposes the electrodes substrate, and a liquid crystal layer containing therein liquid crystal molecules which are driven by an electric field that is generated in a substantially parallel manner with respect to a surface of the electrodes substrate when voltage is applied on the pixel electrodes and counter electrodes; and (2) a driving circuit for supplying specified electric signals to the pixel electrodes and the counter electrodes, wherein an optical compensation layer comprising liquid crystal molecules is provided on the surface of the liquid crystal panel facing to persons looking thereat, and wherein an inclining direction of liquid crystal molecules in the liquid crustal panel is different from an inclining direction of liquid crystal molecules in the compensation layer.

7. The liquid crystal display apparatus according to claim 6 of wherein the pixel electrodes and counter electrodes are comb-like electrodes.

8. The liquid crystal display apparatus according to claim 7, wherein the pixel electrodes and counter electrodes are comb-like electrodes, and longitudinal directions of comb-teeth portions of the comb-like electrodes are aligned to be parallel to each other.

\* \* \* \* \*